(No Model.)
T. H. HUTCHINSON.
CISTERN VALVE FOR FLUSHING WATER CLOSETS.
No. 580,525. Patented Apr. 13, 1897.
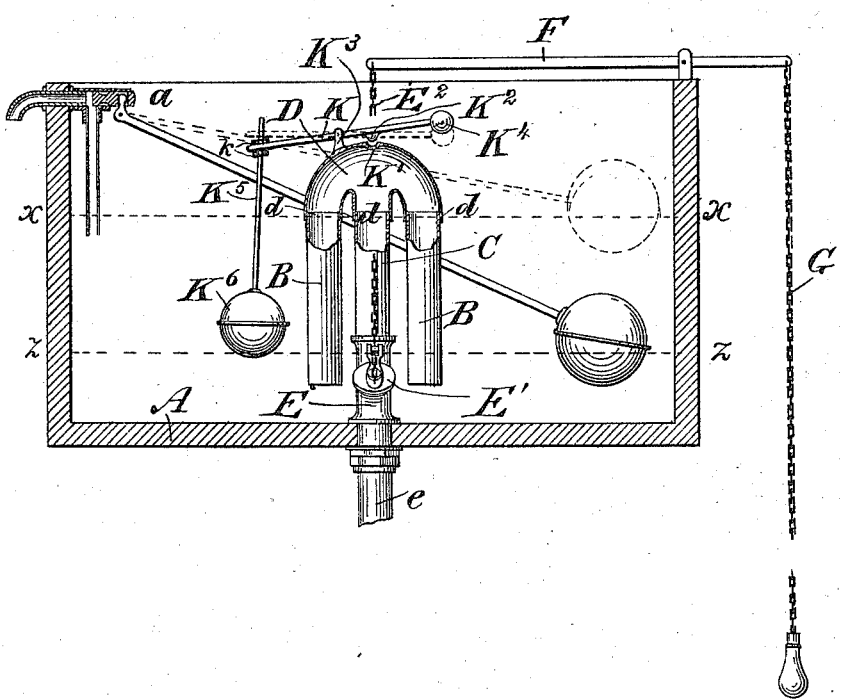
WITNESSES:
Frank M. Senior
Alfred Beatty Jr.
INVENTOR
Thomas H. Hutchinson
BY
Stephen J. Cox
ATTORNEY

UNITED STATES PATENT OFFICE.

THOMAS H. HUTCHINSON, OF BROOKLYN, NEW YORK, ASSIGNOR TO GEORGE C. MILLER AND FRANKLIN MILLER, OF NEW YORK, N. Y.

CISTERN-VALVE FOR FLUSHING WATER-CLOSETS.

SPECIFICATION forming part of Letters Patent No. 580,525, dated April 13, 1897.

Application filed August 20, 1895. Serial No. 559,883. (No model.)

*To all whom it may concern:*

Be it known that I, THOMAS H. HUTCHINSON, a citizen of the United States, residing at Brooklyn, in the county of Kings and State of New York, have invented a new and useful Improvement in Cistern-Valves for Flushing Water-Closets; and I hereby declare that the following is a full, clear, and exact description of the invention, enabling those skilled in the art to which it pertains to make and use the same.

My invention relates to improvements in valves such as are usually employed in regulating the discharge of water from cisterns for the purpose of flushing water-closet bowls. Its object is to afford an ample flush for the closet, and while doing so prevent the noise caused by the regurgitation of the water and air while passing through the siphon-tubes of the valve. This is effected by means of the device illustrated in the accompanying drawing, which is a sectional view of a cistern with the siphon-valve, partly in section, in position.

Letter A represents a tank or cistern of the ordinary type, having an inlet-supply pipe $a$, controlled by the usual float, the line $x\,x$ representing the line of water at the time when the tank is full, and 2 2 representing the same after a discharge.

B B represent two siphon-tubes of the valve, which are arranged so as to extend to within a short distance of the bottom of the tank.

C is the stand-pipe of the valve.

D is a semicircular-shaped pipe having three openings $d\,d\,d$, into the center one of which the stand-pipe C is threaded, and into the other two the siphon-pipes B B are threaded. This whole section may be cast in one piece, but it is preferably made in sections, so that it may be adjustable.

Upon the upper part of the pipe D is a valve K', with valve-plug $K^2$ upon the lever K. The lever K is attached to the pipe D by means of a pin in the standard $K^3$ and has its fulcrum thereon. Upon the end of the lever nearest the valve is the balance-ball $K^4$, while upon the other end the lever is flattened and has an opening through which the rod $K^5$ passes. This rod is threaded near its upper end and is provided with nuts $k$ for the purpose of adjustment, while upon its lower end is the float $K^6$. The stand-pipe C is screw-tapped into the valve-casting E, which is provided with a hinged valve E', operated by means of the chain $F^2$, lever F, and pull G. The valve is mounted on the cistern-box A, through which its discharge-pipe $e$ passes. It is secured to the box in the usual manner by jam-nuts and washers.

The operation of this device is as follows: The valve E' is opened by pulling downward the pull G until a sufficient amount of water has entered the pipe to operate the siphon. The pull may then be released and the water will flow through the pipes B B until the falling of the water causes the float $K^6$ to drop, thus opening the valve K' by means of the lever K and allowing the air to enter and break the siphon.

I have shown the parts of my device throughout as of the ordinary construction used in such articles. It is obvious, however, that other details of construction may be used without affecting the nature of my invention. I do not claim these particular details. In the construction of this valve it may be made to operate by using one siphon-tube, but its construction with a plurality of siphon-tubes is preferred, as it works more promptly when so constructed. While therefore preferring more than one siphon-tube, I do not confine myself to them.

What I claim, and desire to secure by Letters Patent, is—

In a water-closet cistern the combination of a discharge-pipe provided with a plurality of siphon legs or branches and a valve for the admission of air situated at the point where the said siphon-legs meet; said valve being operated by the rise and fall of the water in said tank.

THOMAS H. HUTCHINSON.

Witnesses:
STEPHEN J. COX, Jr.,
FRANK M. SENIOR.